United States Patent
Abaas

(10) Patent No.: US 12,388,256 B2
(45) Date of Patent: Aug. 12, 2025

(54) SYSTEMS AND METHODS OF TRANSFERRING ENERGY FOR NETWORKED MICROGRIDS

(71) Applicant: Mohamed Gamal Abaas, Bryn Mawr, PA (US)

(72) Inventor: Mohamed Gamal Abaas, Bryn Mawr, PA (US)

(73) Assignee: Mohamed Gamal Abaas, Bryn Mawr, PA (US)

( * ) Notice: Subject to any disclaimer, the term of this patent is extended or adjusted under 35 U.S.C. 154(b) by 333 days.

(21) Appl. No.: 17/853,122

(22) Filed: Jun. 29, 2022

(65) Prior Publication Data

US 2022/0416541 A1    Dec. 29, 2022

Related U.S. Application Data

(60) Provisional application No. 63/216,010, filed on Jun. 29, 2021.

(51) Int. Cl.
*H02J 3/00* (2006.01)
*G06Q 50/06* (2012.01)

(52) U.S. Cl.
CPC .............. *H02J 3/003* (2020.01); *G06Q 50/06* (2013.01); *H02J 3/001* (2020.01); *H02J 3/004* (2020.01); *G06Q 2220/00* (2013.01)

(58) Field of Classification Search
CPC ....................................................... H02J 3/003
See application file for complete search history.

(56) References Cited

U.S. PATENT DOCUMENTS

| | | | |
|---|---|---|---|
| 7,373,222 B1 | 5/2008 | Wright et al. | |
| 11,817,704 B2 * | 11/2023 | Rilett | G06Q 50/06 |
| 2010/0306097 A1 | 12/2010 | Greiner et al. | |
| 2012/0101932 A1 | 4/2012 | Slutsker et al. | |
| 2012/0271470 A1 * | 10/2012 | Flynn | H02J 3/381 |
| | | | 700/292 |
| 2016/0056631 A1 | 2/2016 | Ilo | |
| 2016/0241031 A1 | 8/2016 | Hooshmand et al. | |
| 2019/0121350 A1 * | 4/2019 | Cella | G01M 13/028 |
| 2019/0370693 A1 * | 12/2019 | Franklin, Jr. | G01W 1/10 |
| 2020/0065628 A1 * | 2/2020 | Olnick | G01R 21/133 |
| 2022/0069613 A1 * | 3/2022 | Reddy | H02J 7/0068 |

FOREIGN PATENT DOCUMENTS

| | | | |
|---|---|---|---|
| CN | 101803138 A1 | 8/2010 | |
| CN | 110738375 A * | 1/2020 | |
| KR | 20190109914 A | 9/2019 | |
| WO | WO-2018013148 A1 * | 1/2018 | G06N 20/00 |
| WO | 2019105992 A1 | 6/2019 | |

OTHER PUBLICATIONS

Abaas et al., "Blockchain Applications in Smart Grid Systems," Apr. 11, 2021, 6 pages.
Abaas et al., "Long Short-Term Memory Customer-Centric Power Outage Prediction Models for Weather-Related Power Outages," Nov. 22, 2022, 6 pages.

* cited by examiner

*Primary Examiner* — Suresh Suryawanshi
(74) *Attorney, Agent, or Firm* — Flaster Greenberg P.C.

(57) ABSTRACT

A system for transferring energy based on predicted outages is described herein.

18 Claims, 9 Drawing Sheets

SYSTEMS AND METHODS OF TRANSFERRING ENERGY FOR NETWORKED MICROGRIDS

CROSS REFERENCE TO RELATED APPLICATION

This application claims the benefit of U.S. Provisional Application No. 62/216,010, filed Jun. 29, 2021, the contents of which are hereby incorporated by reference herein.

BACKGROUND

Smart grids provide more efficient and reliable electric grid systems through the incorporation of digitization, communication of real time power line sensed data, and control automation. At the same time, renewable energy technologies, including solar panels and wind turbines have become more efficient and less expensive, and hence more economical.

Current systems are vulnerable to cyber-attacks through, for example, distributed energy resources. Although certain cybersecurity measures have been incorporated into distributed energy resources, such systems are inadequate for providing protection of microgrid delivery and consumption of electricity. In addition, current systems are unable to predict and anticipate outages or critical load periods in a grid, causing down time or lost energy production in a microgrid.

SUMMARY

A method, system, and apparatus for the distribution of information and energy are described herein.

In one or more cases, a system is provided that includes a non-transitory memory having instructions stored thereon and a processor configured to execute the instructions. In one or more cases, the system receives a plurality of parameters corresponding to at least one microgrid. In one or more cases, the system predicts one or more outages of the at least one microgrid, in which the one or more outages are predicted by a trained machine learning model, in which the trained machine learning model is generated based on a training data set including historical outage information and historical parameters. In one or more cases, the system determines an initial energy distribution level based on the predicted one or more outages. In one or more cases, the system associates an available energy supply corresponding to a first plurality of smart meters and a requested amount of energy corresponding to a second plurality of smart meters. In one or more cases, the system associates a first available smart meter of the first plurality of smart meters with a first available smart meter of the second plurality of smart meters. In one or more cases, the system transfers energy between the first available smart meter of the first plurality of smart meters with the first available smart meter of the second plurality of smart meters.

DETAILED DESCRIPTION

Figure 1:
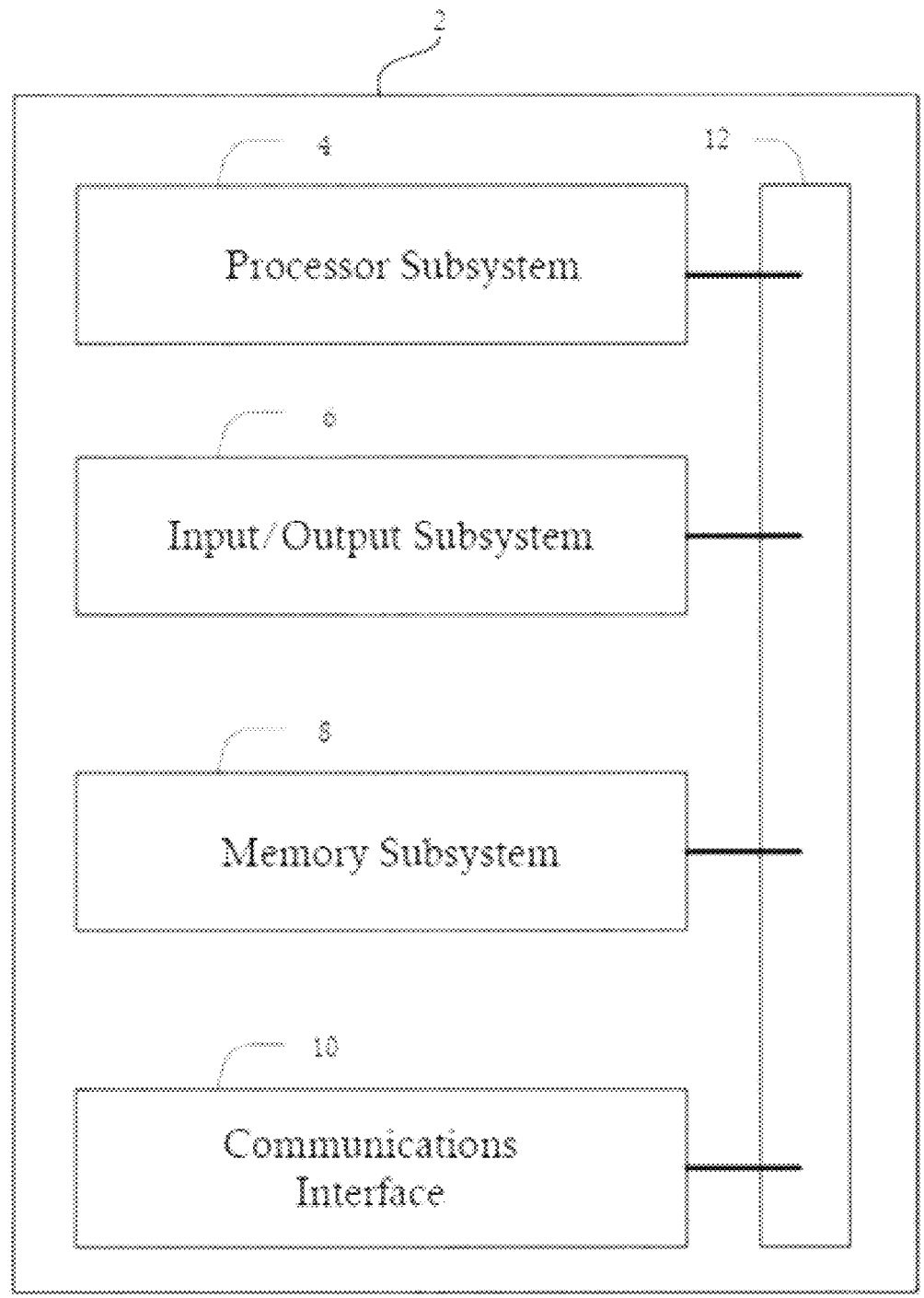
FIG. 1 illustrates a block diagram of a computer system.

The following discussion omits or only briefly describes conventional features of energy transfer systems, which are apparent to those skilled in the art. It is noted that various embodiments are described in detail with reference to the drawings, in which like reference numerals represent like parts and assemblies throughout the several views. Reference to various embodiments does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, elements, and/or components, but do not preclude the presence or addition of one or more other features, steps, operations, elements, components, and/or groups thereof.

FIG. 1 illustrates a computer system configured to implement one or more processes. The system 2 is a representative device and may comprise a processor subsystem 4, an input/output subsystem 6, a memory subsystem 8, a communications interface 10, and a system bus 12. In one or more cases, one or more than one of the system 2 components may be combined or omitted such as, for example, not including an input/output subsystem 6. In one or more cases, the system 2 may comprise other components not combined or comprised in those shown in FIG. 1. For example, the system 2 may also include, for example, a power subsystem. In one or more other cases, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In one or more cases, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCM-CIA), Small Computers Interface (SCSI) or other proprietary bus, or any custom bus suitable for computing device applications.

In one or more cases, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In one or more cases, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In one or more cases, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In one or more cases, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication include a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points include, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n/ac, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In one or more cases, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In one or more cases, the memory subsystem 8 may comprise any machine-readable or computer-readable media capable of storing data, including both volatile/non-volatile memory and removable/non-removable memory. The memory subsystem 8 may include at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one or more cases, the memory subsystem 8 may contain an instruction set, in the form of a file for executing various methods, such as methods including A/B testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C #, Python, Objective-C, Visual Basic, or .NET programming. In one or more cases, a compiler or interpreter is comprised to convert the instruction set into machine executable code for execution by the processing subsystem 4.

Figure 2:
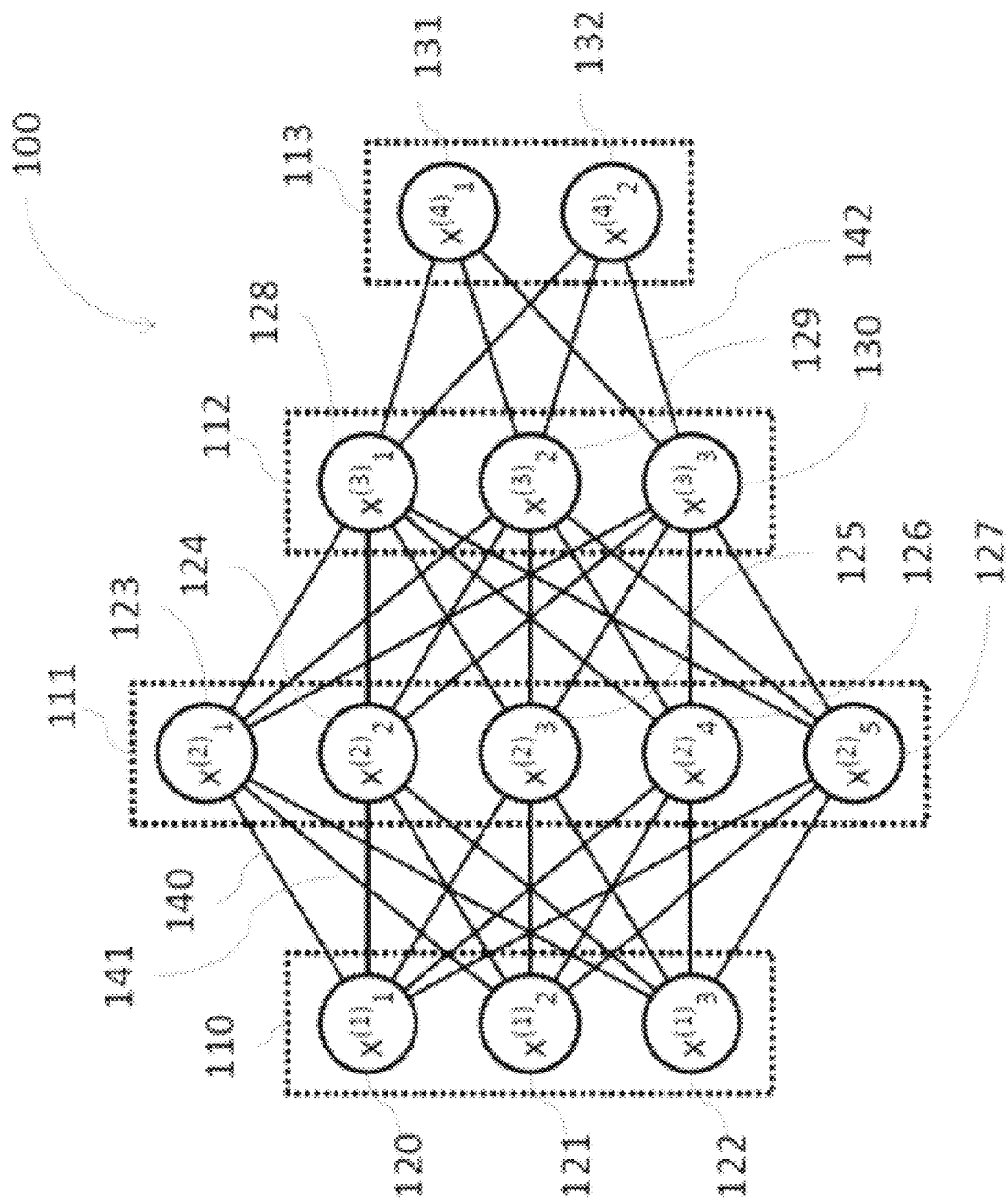
FIG. 2 illustrates an example an artificial neural network.
Figure 6:
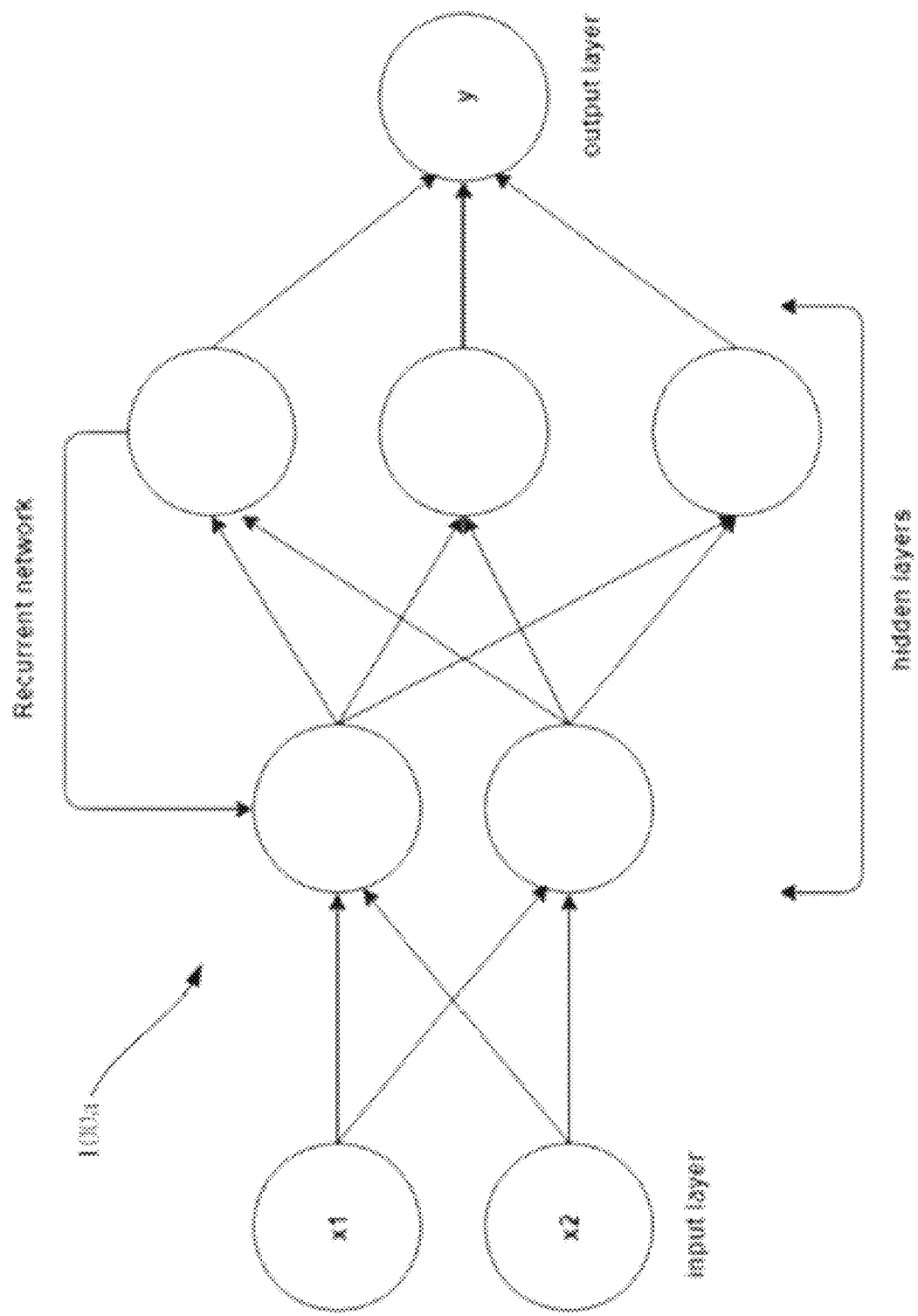
FIG. 6 illustrates an example recurrent artificial neural network.

FIGS. 2 and 6 illustrate example artificial neural networks. Non-limiting examples of alternative terms for "artificial neural network" are "neural network," "artificial neural net," "neural net," or "trained function." As shown in FIG. 2, the artificial neural network 100 comprises nodes 120-132 and edges 140-142, wherein each edge 140-142 is a directed connection from a first node 120-132 to a second node 120-132. In general, the first node 120-132 and the second node 120-132 are different nodes 120-132, although it is also possible that the first node 120-132 and the second node 120-132 are identical. For example, in FIG. 2 the edge 140 is a directed connection from the node 120 to the node 123, and the edge 142 is a directed connection from the node 130 to the node 132. An edge 140-142 from a first node 120-132 to a second node 120-132 is also denoted as "ingoing edge" for the second node 120-132 and as "outgoing edge" for the first node 120-132.

In one or more cases, the nodes 120-132 of the artificial neural network 100 can be arranged in layers 110-113, in which the layers can correspond to an intrinsic order introduced by the edges 140-142 between the nodes 120-132. For example, edges 140-142 may exist only between neighboring layers of nodes. In an example, as illustrated in FIG. 2, there is an input layer 110 including only nodes 120-122 without an incoming edge, an output layer 113 including only nodes 131, 132 without outgoing edges, and hidden layers 111, 112 in-between the input layer 110 and the output layer 113. In general, the number of hidden layers 111, 112 may be chosen arbitrarily. The number of nodes 120-122 within the input layer 110 usually relates to the number of input values of the neural network, and the number of nodes 131, 132 within the output layer 113 usually relates to the number of output values of the neural network.

In one or more cases, a (real) number can be assigned as a value to every node 120-132 of the neural network 100. Here, $x^{(n)}_i$ denotes the value of the i-th node 120-132 of the n-th layer 110-113. The values of the nodes 120-122 of the input layer 110 are equivalent to the input values of the neural network 100, the values of the nodes 131, 132 of the output layer 113 are equivalent to the output value of the neural network 100. Furthermore, each edge 140-142 can comprise a weight being a real number, for example, the weight is a real number within the interval [−1, 1] or within the interval [0, 1]. Here, $w^{(m,n)}_{i,j}$ denotes the weight of the edge between the i-th node 120-132 of the m-th layer 110-113 and the j-th node 120-132 of the n-th layer 110-113. Furthermore, the abbreviation $w^{(n)}_{i,j}$ is defined for the weight $w^{(n,n+1)}_{i,j}$.

In one or more cases, to calculate the output values of the neural network 100, the input values are propagated through the neural network. For example, the values of the nodes 120-132 of the (n+1)-th layer 110-113 can be calculated based on the values of the nodes 120-132 of the n-th layer 110-113 by:

$$x_j^{(n+1)} = f(\Sigma_i x_i^{(n)} \cdot w_{i,j}^{(n)})$$

in which the function f is a transfer function (another term is "activation function"). Known transfer functions are step functions, sigmoid functions (e.g. the logistic function, the generalized logistic function, the hyperbolic tangent, the Arctangent function, the error function, the smoothstep function), or rectifier functions. The transfer function may be used for normalization purposes.

In one or more cases, the values are propagated layer-wise through the neural network, in which values of the input layer 110 are given by the input of the neural network 100, values of the first hidden layer 111 may be calculated based on the values of the input layer 110 of the neural network, values of the second hidden layer 112 can be calculated based in the values of the first hidden layer 111, etc.

In order to set the values $w^{(m,n)}_{i,j}$ for the edges, the neural network 100 has to be trained using training data. For example, training data includes training input data and training output data (denoted as $t_i$). For a training step, the neural network 100 is applied to the training input data to generate calculated output data. In one or more cases, the training data and the calculated output data include a number of values, said number being equal with the number of nodes of the output layer.

In one or more cases, a comparison between the calculated output data and the training data is used to recursively adapt the weights within the neural network 100 (backpropagation algorithm). In one or more cases, the weights are changed according to:

$$w'^{(n)}_{i,j} = w^{(n)}_{i,j} - \gamma \cdot \delta^{(n)}_j \cdot x^{(n)}_i$$

in which $\gamma$ is a learning rate, and the numbers $\delta^{(n)}_j$ can be recursively calculated as:

$$\delta^{(n)}_j = (\Sigma_k \delta^{(n+1)}_k \cdot w^{(n+1)}_{j,k}) \cdot f'(\Sigma_i x^{(n)}_i \cdot w^{(n)}_{i,j})$$

based on $\delta^{(n+1)}_j$, if the (n+1)-th layer is not the output layer, and $$\delta^{(n)}_j = (x^{(n+1)}_k - t_j{}^{(n+1)}) \cdot f'(\Sigma_i x^{(n)}_i \cdot w^{(n)}_{i,j})$$

if the (n+1)-th layer is the output layer 113, wherein f' is the first derivative of the activation function, and $y^{(n+1)}_j$ is the comparison training value for the j-th node of the output layer 113.

FIG. 6 illustrates an example recurrent neural network (RNN) 100a, such as, but not limited to, a Long Short Term Memory (or LTSM) network. A RNN network includes a recurring weight calculation that accounts for timeseries data, such as, for example, weather and/or demand data, as discussed herein. Recurrent networks include an internal state (or a variable state) that represents context information. State information regarding past input is maintained for a variable amount of time that may depend on, for example, weights and on the input data. Although the examples provided are discussed herein with respect to LTSM networks, it will be appreciated that any other suitable RNN network may be used.

Figure 3:
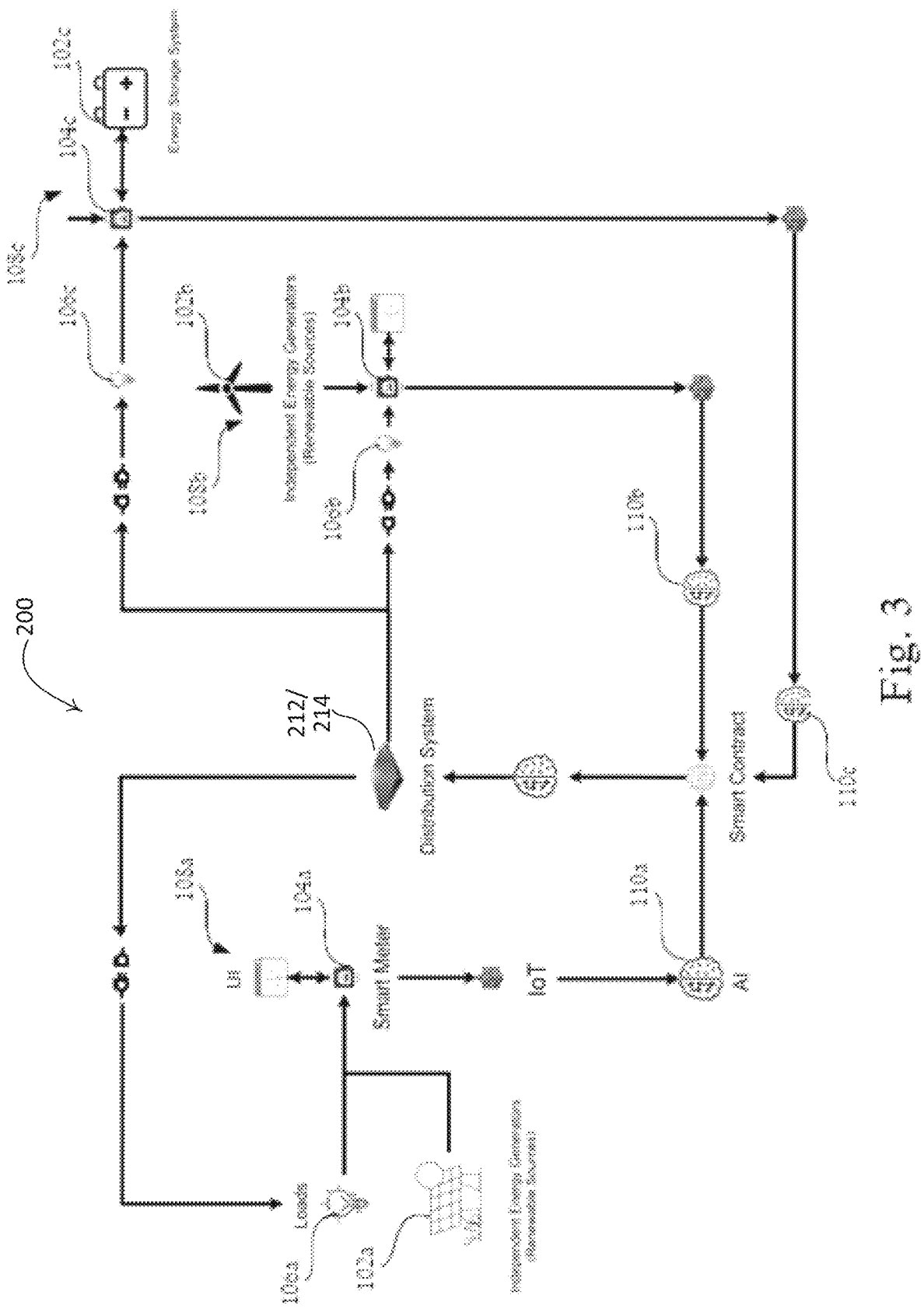
FIG. 3 illustrates an example microgrid architecture.

FIG. 3 illustrates a microgrid architecture 200. The microgrid architecture 200 includes a plurality of microgrid controllers (such as smart meters 104a-104c). Each of the microgrid controllers may function as an energy consumer and/or an energy prosumer. In an example, an energy consumer includes a location, device, system, etc. that consumes electricity from the grid. In an example, a prosumer includes a location, device, system, etc. that provides electricity to a grid. It will be appreciated that a single microgrid controller may function as both a consumer and a prosumer in different microgrid configurations, during different times of the day, under different loads, and/or according to one or more additional parameters.

In one or more cases, a microgrid may be a self-sufficient energy system that serves a discrete geographic location. Examples of microgrid-serviced locations include, but are not limited to, a college or business campus, a hospital complex, a business center, or a neighborhood. A microgrid may include energy production within the microgrid, such as, for example, production through distributed energy such as solar panels, wind turbines, combined heat & power, generators, and the like that produce power for consumption within the microgrid. A microgrid may be configured to generate a lesser and/or greater amount of power than is consumed by the microgrid during specific time periods. In one or more cases, energy transfer may occur between microgrids, for example, transferring a surplus of energy from a first microgrid to a second microgrid having an energy deficit. Transfers of energy may be facilitated in the form of energy trading, i.e., transferring a predetermined quantum of energy for a set price.

In one or more cases, one or more of the microgrid controllers are configured to implement a trained machine learning model that is configured to predict potential outages. As used herein, the term "outages" may refer to periods in which one or more local energy producing mechanisms, such as local renewable energy mechanisms, are incapable of meeting the required load. An outage may be a partial outage or a total outage. The trained machine learning model may be configured to analyze load, generation capacity, weather data, and/or other parameters to predict potential outages. As discussed herein, in one or more cases, the trained machine learning model is generated using one or more training data sets including historic outage information correlated with historic load data, historic generation capacity, historic weather data, and/or other historic parameters.

In one or more cases, the trained machine learning model is configured to set a quotient of energy that is available for trading across one or more microgrids. For example, the trained machine learning model (e.g., machine learning model 720) may be configured to predict one or more upcoming outages and set a quotient of energy for trading that is available during the upcoming predicted outage period for trading within a microgrid and/or across microgrids.

In one or more cases, each of the microgrid controllers are configured to implement a shared distributed ledger for data tracking, verification, and/or validation. The shared distributed ledger may include a general purpose, publicly available ledger, such as Blockchain; a purpose built, public ledger; a general purpose private ledger; and/or a purpose built, private ledger. The distributed ledger may be configured to implement one or more smart contract methods to provide settling of, for example, hourly bids among microgrid consumers and prosumers while prioritizing critical loads during time windows with predicted power outages.

The disclosed network environment, and the associate components thereof, are configured to provide power grid resilience through decentralization of structure while maximizing availability of energy for trading and/or distribution. The disclosed network environment may be configured to mitigate energy outages. Although the disclosed systems and methods utilize microgrid controllers, it will be appreciated that the disclosed systems and methods may be applied to any smart grid, including, but not limited to, micro-solar based systems, multiple-source systems (e.g., mixed renewable/consumable energy systems), and/or other grid configurations.

In one or more cases, the disclosed network environment is configured to decrease outage periods caused by natural disasters, grid overload, generation deficiencies, and the like. The disclosed network environment increases reliability of each microgrid by predicting outages for the specific microgrid and obtaining external energy commitments, for example, in the form of energy trading transactions, to cover the periods of predicted outages. In one or more cases, the disclosed network environment reduces overall recovery time from unpredicted outages and/or outages that are more extreme than predicted and/or reduces the number of individuals impacted by wider grid outages by supplying power to and/or from various microgrids. For instance, by transferring energy between smart meters based on a first in-first out basis as described herein, the number of impacted individuals and/or the overall recovery time may be reduced.

The microgrid architecture 200 includes one or more independent energy generators 102a, 102b, such as, for example, renewable energy sources in the form of solar power, wind power, geothermal power, hydroelectric power, etc. Although embodiments are discussed herein regarding renewable energy generators 102a, 102b, it will be appreciated that any suitable energy sources, such as non-renewable (e.g., coal, oil, natural gas, nuclear), renewable, etc. may be used. In one or more cases, an energy storage system 102c, such as a battery system, potential energy system, thermal energy systems, and/or any other suitable energy storage system, may be configured to store energy generated by the independent energy generators 102a, 102b and/or other energy generation systems (not shown).

In one or more cases, each of the independent energy generators 102a, 102b and/or energy storage systems 102c are coupled to a respective smart meter 104a-104c. Each smart meter 104a-104c is further connected to one or more loads 106a-106c. In one or more cases, each energy source 102a-102c, associated smart meter 104a-104c, and associated load(s) 106a-106c are included in a microgrid 108a-108c. The microgrids 108a-108c may, under typical load conditions, be configured to operate based solely on energy input provided by the associated energy source 102a-102c.

In one or more cases, each smart meter 104a-104c is configured to implement a trained machine learning model 110a-110c to predict power consumption, outages, and/or other operational parameters of the associated microgrid 108a-108c. In one or more cases, each of the smart meters 104a-104c is coupled to a separate system configured to implement the associated trained machine learning model 110a-110c by an internet of things (IoT) device connection, although it will be appreciated that, in some cases, the associated trained machine learning model 110a-110c may be implemented directly by the associated smart meter 104a-104c.

In one or more cases, a distribution system 212 is configured to facilitate distribution of information and/or energy between the microgrids 108a-108c. The distribution system 212 may provide facilities for transferring surplus energy from one or more of the microgrids 108a-108c to one or more of the other microgrids 108a-108c operating at an energy deficit. In one or more cases, the distribution system 212 may be configured to transfer energy from one or more independent energy sources 102a, 102b to the energy storage system 102c during periods of surplus energy generation.

Figure 4:
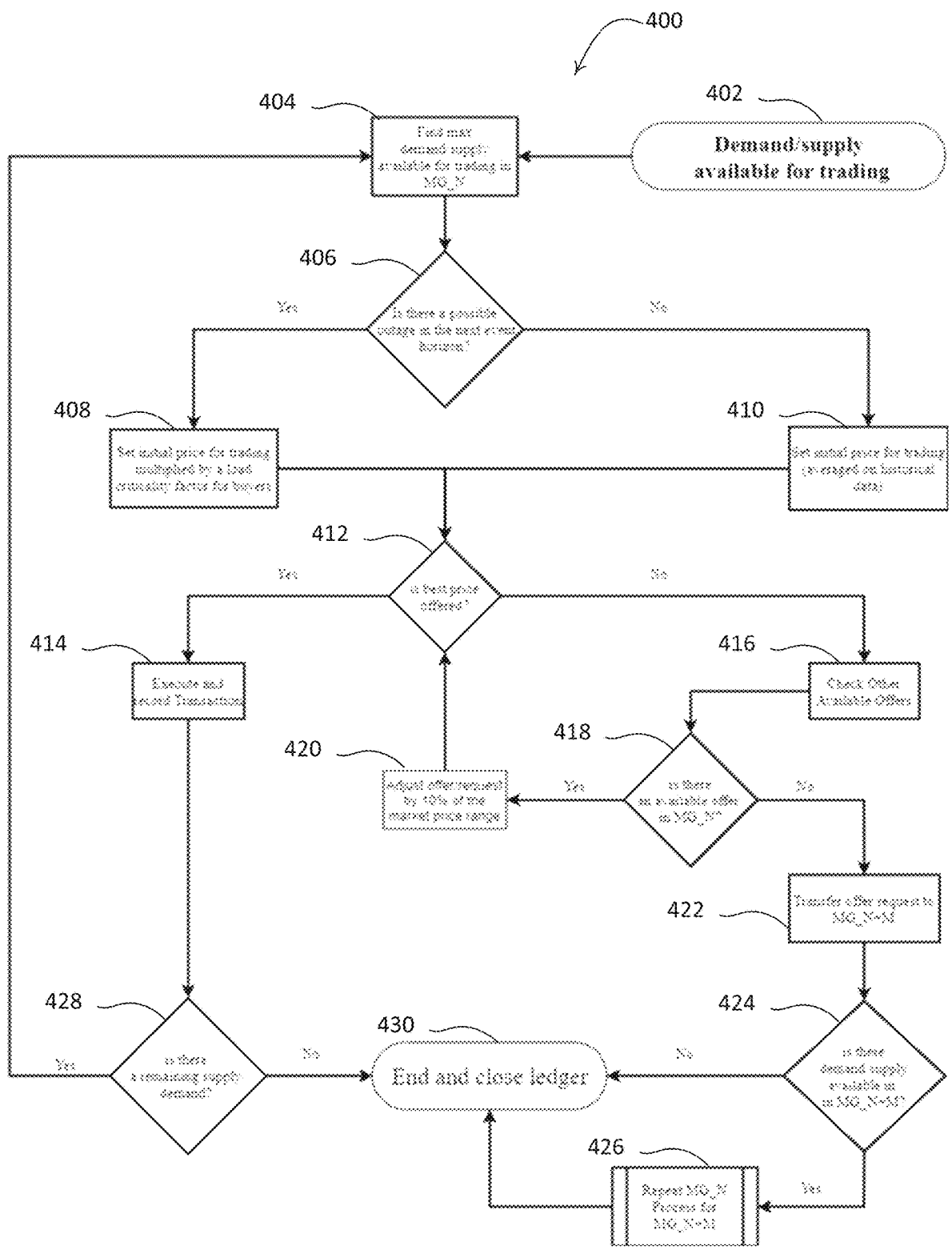
FIG. 4 illustrates a flowchart of an example energy transfer process.

In one or more cases, a smart contract-enabled distributed ledger 214 may be maintained by one or more elements of the system 200, such as the distribution system 212 and/or the smart meters 104a-104c maintain a smart contract-enabled distributed ledger 214 configured to provide for transfer of energy from one or more users of the microgrids 108a-108c (e.g., a prosumer, seller, and like entities) to one or more users of the other microgrids 108a-108c (e.g., a consumer, buyer, and like entities). The distribution system 212 and/or the smart meters 104a-104c may be configured to assign a quantum of energy for transfer at an assigned value based on predicted outages, predicted loads, predicted energy generation, and/or other predicted factors. FIG. 4 illustrates an example of a smart contract algorithm that may be implemented by the smart contract-enabled distributed ledger 214. It is noted that FIG. 4 includes the same or similar steps as those described with respect to FIG. 8. Further, it is noted that FIG. 4 illustrates additional steps (e.g., 412, 416, 418, 420, 422, 424, and 426) distinguishable from those described with respect to FIG. 8.

Figure 5:
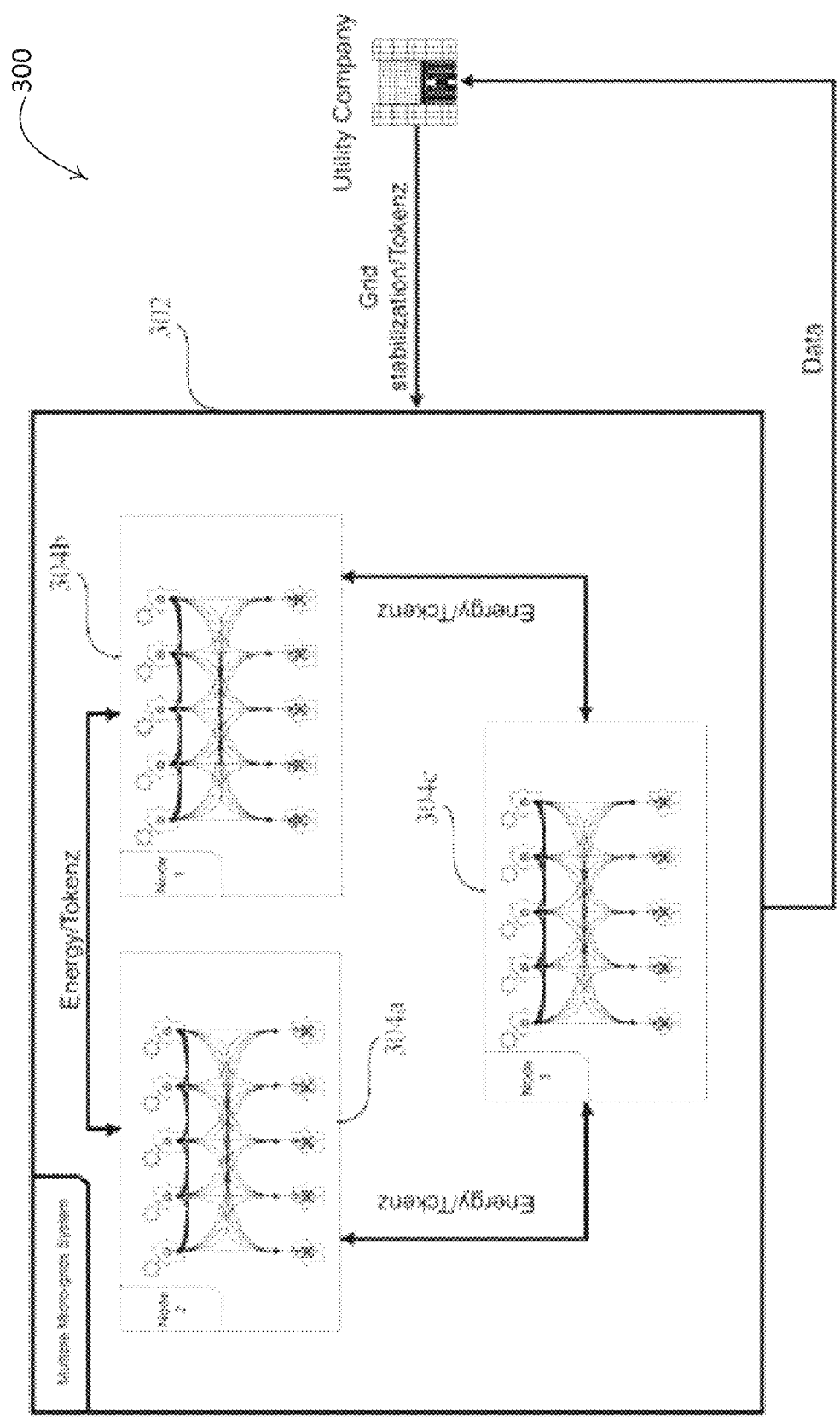
FIG. 5 illustrates a microgrid-to-microgrid transfer enabled network configured to use tokens to track transfer of energy between a distributed grid and a plurality of microgrids.

FIG. 5 illustrates a microgrid-to-microgrid transfer enabled network 300 configured to use tokens to track transfer of energy between a distributed grid 302 and a plurality of microgrids 304a-304c. As discussed herein, each of the microgrids 304a-304c may be configured to consume and/or produce energy based on various factors, including load demand, weather, storage capacity, etc. A trained machine learning algorithm, such as the trained machine learning algorithm 110a-110c discussed herein, may be configured to predict outages and/or surpluses and provide distribution and transfer of energy according to the predicted models. The microgrid-to-microgrid transfer enable network 300 provides for a more widespread deployment of distributed energy resources (DERs) in both grid-tied and isolated microgrid configurations.

Figure 7:
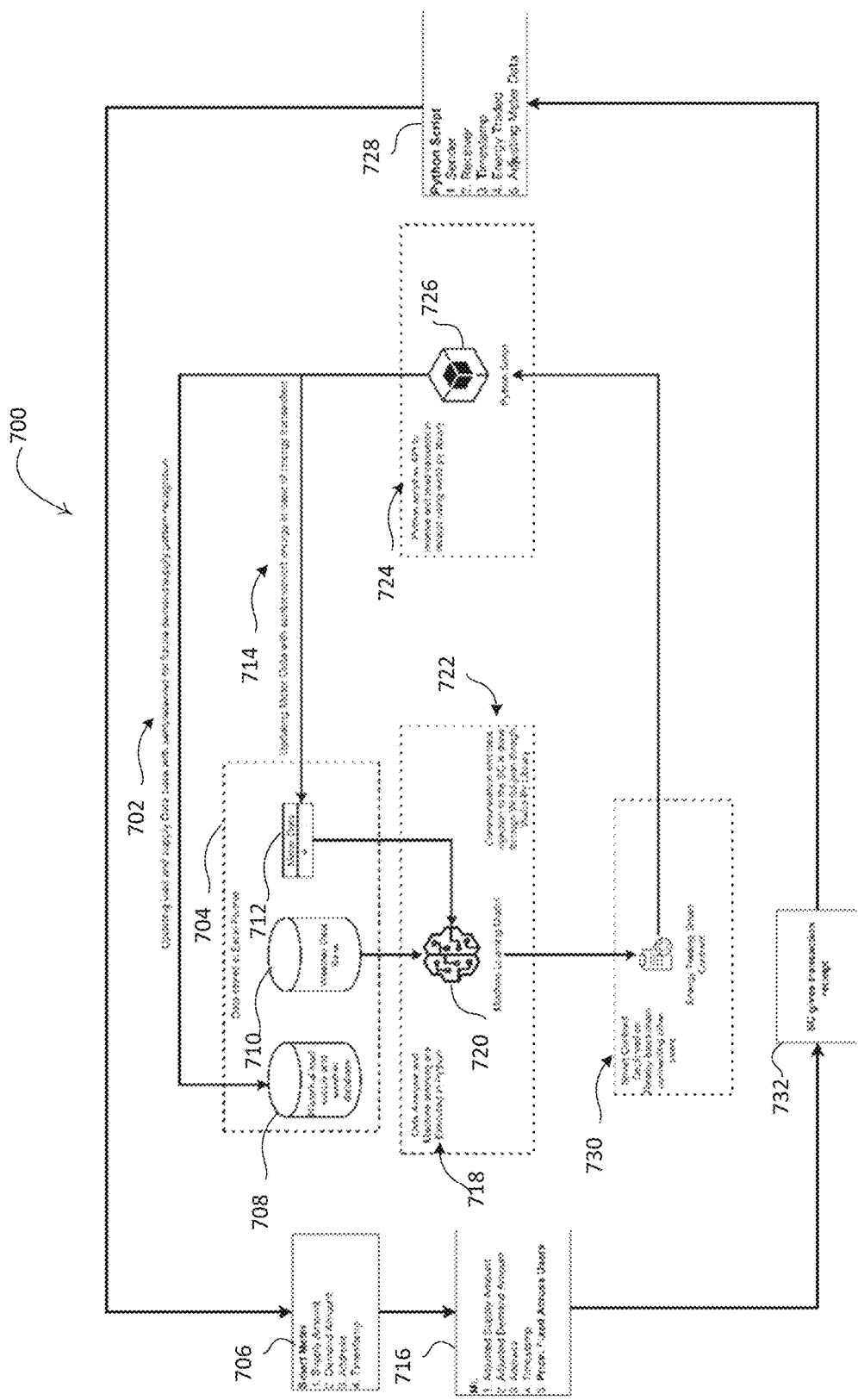
FIG. 7 illustrates a block diagram of energy transfer.
Figure 9:
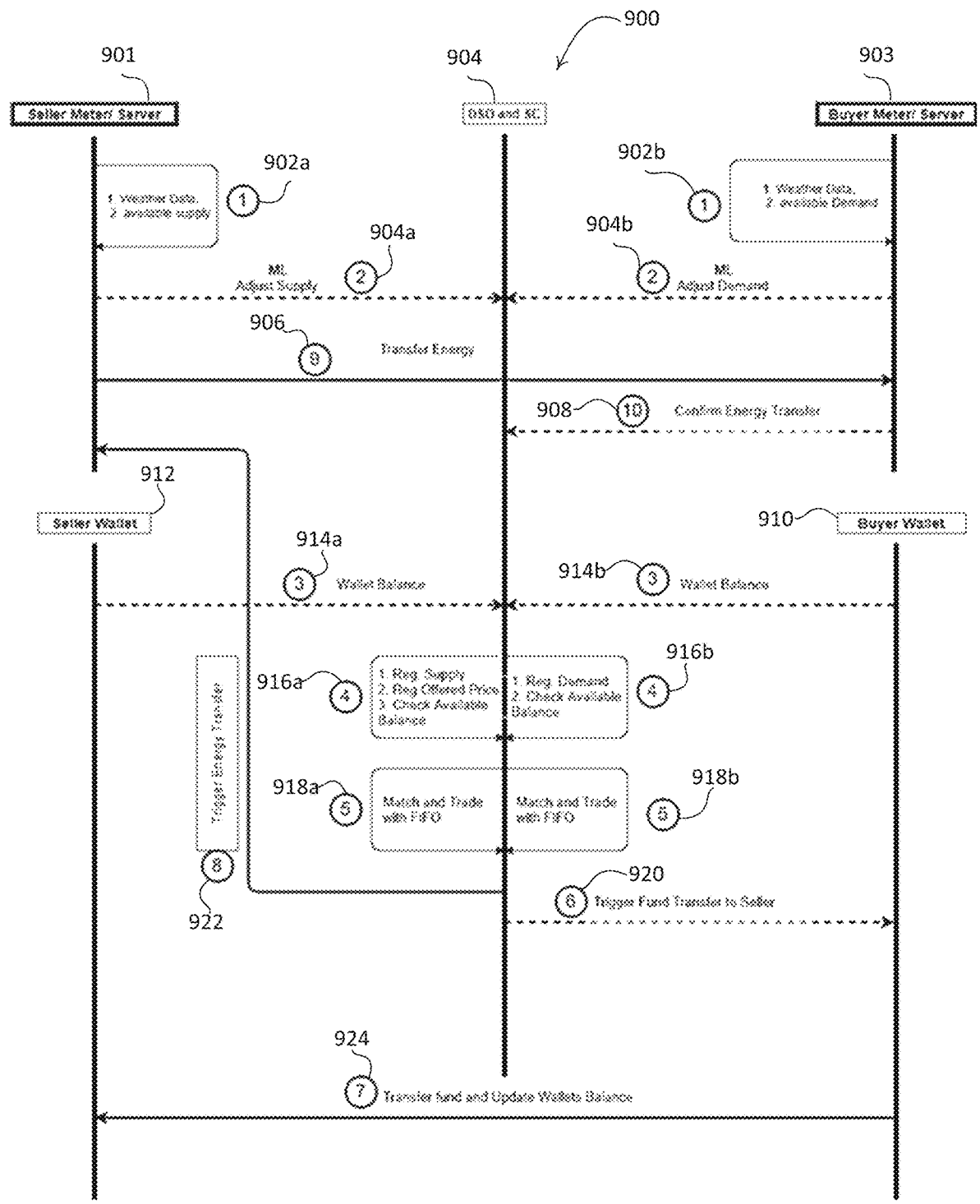
FIG. 9 illustrates data exchanges corresponding to energy transfers.

FIG. 7 is an example block diagram 700 illustrating an energy transfer. In one or more cases, processes described within the example block diagram may be performed by one or more components of the microgrid architecture 200. For instance, the processes may be performed by at least the distribution system 212 and/or a distribution system operator (DSO) 904 as illustrated in FIG. 9. In one or more cases, at 702, the microgrid architecture 200 may update the load and supply database 708 with supply and demand requests for energy. For example, the microgrid architecture 200 may receive a demand from one or more smart meters, such as smart meter 104a, for a certain amount of energy, and information related to an available supply of energy from one or more smart meters, such as smart meter 104b. In one or more cases, at 714, the microgrid architecture 200 may receive and/or update meter data based on energy that is sent or received between smart meters. The microgrid architecture 200 may store the meter data within a meter data database 712. In one or more cases, the microgrid architecture 200 may include and maintain one or more databases, the history load and supply database 708, a weather database 710, and the meter data database 712.

In one or more cases, one or more components of the microgrid architecture 200 (e.g., a smart meter) may provide the available data to a machine learning model 720 (e.g., machine learning models 110a-110c). For example, a smart meter (e.g., associated with a seller) may provide information 706, such as, but not limited to, a supplied amount of energy, an address associated with the smart meter, and a timestamp on when the information was provided. In another example, a smart meter (e.g., associated with a buyer) may provide information 706, such as, but not limited to, a requested amount of energy, an address associated with the smart meter, and a timestamp on when the information was provided. In one or more cases, the microgrid architecture 200 may input data from one or more of the history load and supply database 708, the weather database 710, and the meter data database 712 into the machine learning model 720 to predict outages within a microgrid. The microgrid architecture 200 may implement the data analysis and machine learning in python or like software (718). In one or more cases, model 720 may be implemented on each smart meter.

In one or more cases, the microgrid architecture 200 may provide the analyzed data 716 to a smart contract 730. The analyzed data 716 may include, for example, but not limited to, an adjusted energy supply amount, an adjusted energy demand amount, addresses associated with the smart meters that are supplying and/or demanding energy, timestamps associated with the provided supply amount and requested demand amount, and price associated with the energy transfer. In one or more cases, the price for the energy transfer may be a fixed price. In some cases, the microgrid architecture 200 may communicate the data to the smart contract 730 through Web3j son through Web3.Py library (722). In one or more cases, the smart contract 730 is deployed on a Blockchain, such as, but not limited to, Rinkby Blockchain. In one or more cases, the smart contract 730 may provide a transaction receipt 732 in which the microgrid architecture 200 may use to update the data stored in the database 704, such as one or more of the history load and supply database 708, the weather database 710, and the meter data database 712. To update the database 704, the microgrid architecture 200 may utilize (724), for example, but not limited to, a python script 726 as an API to receive and read the transaction receipt using web3.py library. In one or more cases, the python script may include a variety of information (728), such as, but not limited to, information regarding the sender (e.g., a buyer or seller of energy), the receiver (e.g., the buyer or seller of energy), a timestamp (e.g., when a request to buy for energy was made, when energy was traded between smart meters of respective users, etc.), the energy traded (e.g., the amount of energy traded), and the adjusted meter data (e.g., an adjusted amount of meter data corresponding to the energy received by the buyer).

Figure 8:
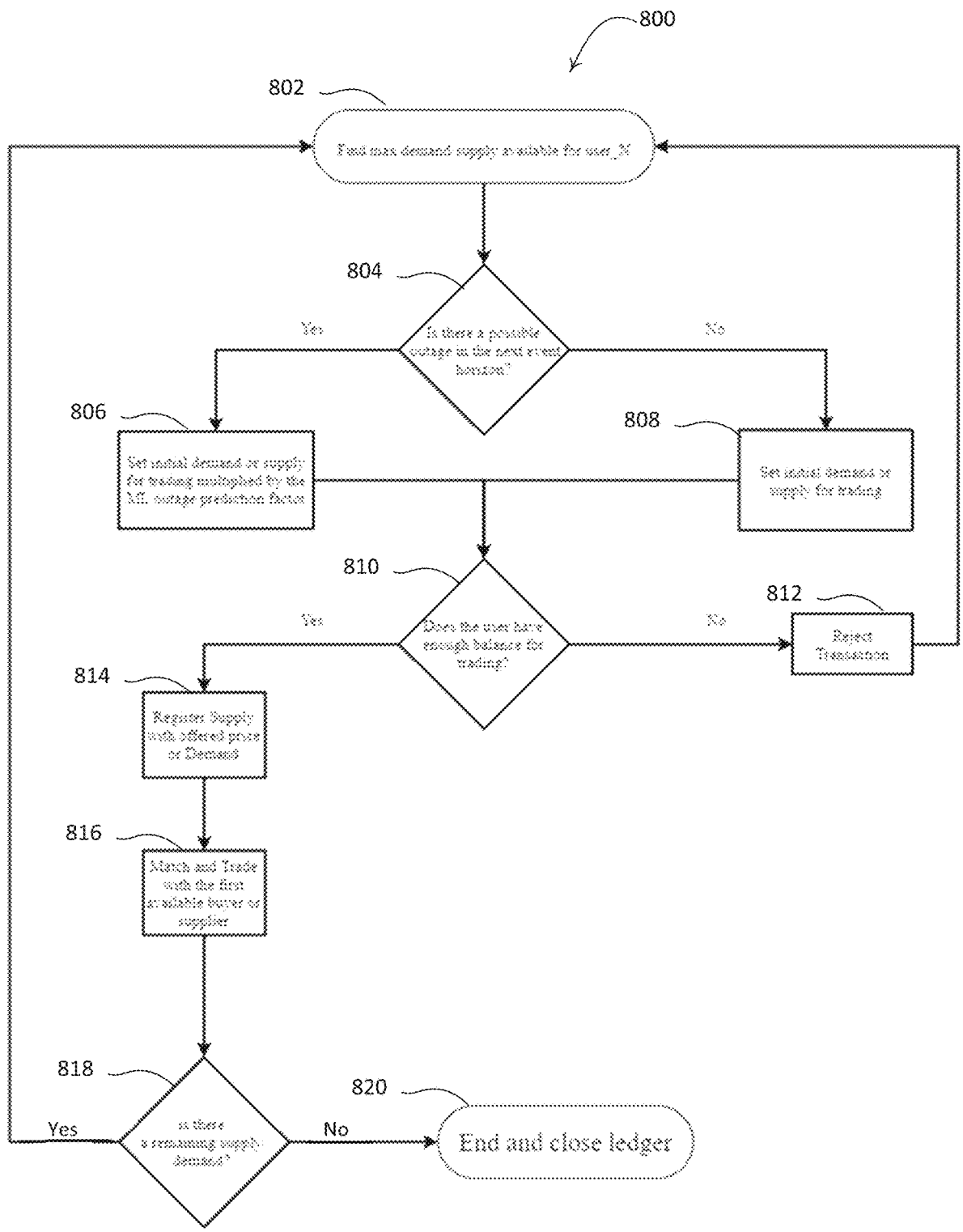
FIG. 8 illustrates a flowchart of another example energy process.

FIG. 8 illustrates a flowchart of an example energy process 800. FIG. 8 illustrates an example of a smart contract algorithm that may be implemented by, for example, the smart contract-enabled distributed ledger 214. In one or more cases, a maximum demand or supply of energy available for one or more users is determined (802). For example, the DSO 904 and/or one or more smart meters 104a-104c may determine a maximum demand or supply of energy available for one or more users. For instance, DSO 904 determines the maximum demand or supply of energy available for one or more users within a microgrid. In one or more cases, a determination is made (804) as to whether there is a possible outage in the next event horizon. For example, DSO 904 and/or one or more smart meters 104a-104c may determine whether there is a possible outage during a time period, for example, but not limited to, predetermined hours within a day, a predetermined day of the week, the next week, month, season, and the like.

For the cases in which it is determined that there is not a possible outage in the next event horizon (804:NO), an initial demand or supply for trading is set (808). For example, the DSO 904 may determine the initial demand and supply for trading between entities (e.g., houses, buildings, and the like) within a smartgrid or within different smartgrids. For the cases in which it is determined that there is a possible outage in the next event horizon (804:YES), an initial demand or supply for trading is set based on an outage prediction factor (806). For example, the DSO 904 may determine the initial demand and supply for trading between entities (e.g., houses, buildings, and the like) within a smartgrid or within different smartgrids, and incorporate the machine learning outage prediction factor into the initial demand and supply for trading. For instance, the DSO 904 may multiply the initial demand and supply with the machine learning outage prediction factor to set the initial demand and supply of energy.

In one or more cases, a determination is made as to whether a user has enough balance for trading (810). For example, DSO 904 and/or one or more smart meters 104a-104c may determine whether a user (e.g., a buyer) of a respective smart meter has enough funds to buy energy or whether a user (e.g., a seller) of a respective smart meter has enough energy (either stored or capable of being provided) to sell energy to another user. For the cases in which DSO 904 and/or one or more smart meters 104a-104c determines that the user does not have enough balance for trading (810:NO), the DSO 904 and/or one or more smart meters 104a-104c rejects energy transfer transactions (812). For example, the DSO 904 and/or one or more smart meters 104a-104c may reject an energy transfer transaction for any energy transaction amount. In another example, the DSO 904 and/or one or more smart meters 104a-104c may reject an energy transfer transaction for any amount exceeding the available balance of funds to use to transfer energy. For the cases in which DSO 904 and/or one or more smart meters 104a-104c determines that the user does have enough balance for trading (810:YES), the DSO 904 and/or one or more smart meters 104a-104c registers a supply of energy with an offered price or demand (814). For example, if a user of a respective smart meter is a seller, the DSO 904 and/or one or more smart meters 104a-104c register a supply of energy with an offered price for the supply of energy. In another example, if a user of a respective smart meter is a buyer, the DSO 904 and/or one or more smart meters 104a-104c register a supply of energy with a request to purchase a particular amount of energy.

In one or more cases, available energy is matched and traded with the first available buyer and available supplier (816). For example, the DSO 904 and/or one or more smart meters 104a-104c may match and trade energy based on the registered supply and demand of energy among the users of the respective smart meters 104a-104c. For example, the DSO 904 may determine a first available buyer of energy (e.g., smart meter 104a) and a first available supplier of energy (e.g., smart meter 104b) and may match the associated smart meters to conduct the energy and funds transfer as described herein.

In one or more cases, a determination is made as to whether there is a remaining supply or demand of energy (818). For instance, the DSO 904 and/or one or more smart meters 104a-104c may determine whether there is a remaining supply of energy or demand for energy based on the registered supply and demand of energy from the respective smart meters. For the cases in which the DSO 904 and/or one or more smart meters 104a-104c determine that there is not a remaining supply or demand of energy (818:No), the DSO 904 ends and closes the ledger (820). For the cases in which the DSO 904 and/or one or more smart meters 104a-104c determine that there is a remaining supply or demand of energy (818:Yes), the DSO 904 and/or one or more smart meters 104a-104c may determine a maximum demand or supply of energy available for one or more users (802).

FIG. 9 illustrates data exchanges 900 corresponding to energy transfers between two example smart meters, such as smart meter 901 and smart meter 903. Smart meter 901 and smart meter 903 may be, for example, smart meter 104a and smart meter 104b, respectively. FIG. 9 may implement the example smart contract algorithm, in which energy and funds transfers are tracked via, for example, the smart contract-enabled distributed ledger 214.

In one or more cases, the smart meter 901 provides (902*a*) weather data associated with the location of the smart meter 901 and an available supply of power into a machine learning model, such as model 720. The machine learning model may adjust the available energy supply levels based on the inputted data. In one or more cases, the smart meter 903 provides (902*b*) weather data associated with the location of the smart meter 903 and a requested amount of power into a machine learning model, such as model 720. The machine learning model may adjust a level of demand for energy based on the inputted data.

In one or more cases, the DSO 904 receives the adjusted supply level (904*a*) and the adjusted demand level (904*b*). Further, the DSO 904 receives a wallet balance 914*a* associated with a wallet 912 that corresponds to smart meter 901. The DSO 904 receives a wallet balance 914*b* associated with a wallet 910 that corresponds to smart meter 903. In one or more cases, the DSO 904 determines at 916*a* the registered supply of energy, the registered offered price for the energy, and an available balance of energy that may be supplied. In one or more cases, the DSO 904 determines at 916*b* the registered demand/request for a certain amount of energy and an available balance of funds to complete the energy purchase and transfer. The DSO 904 may compare the determined information at 916*a* and 916*b* to determine whether the seller of smart meter 901 has enough available energy to fulfill the requested amount of energy from the buyer of smart meter 903, and to determine whether the buyer of smart meter 903 has enough available funds based on the wallet balance to complete the transaction.

In one or more cases, the DSO 904 matches a smart meter (e.g., smart meter 901) associated with a seller capable of providing a requested amount of energy with a smart meter (e.g., smart meter 903) associated with the buyer requesting energy (918*a*, 918*b*). In one or more cases, the DSO 904 matches seller and buyer smart meters based on a first in-first out (FIFO) basis. As such, it is noted that although FIG. 9 illustrates an energy transfer and transaction between smart meters 901 and 903, it should be understood that the DSO 904 may receive information regarding energy supply levels from a plurality of smart meters and may receive information regarding requested/demanded amounts of energy from a plurality of smart meters. Further, the DSO 904 matches the smart meters associated with energy sellers with smart meters associated with energy buyers on a FIFO basis.

In one or more cases, the DSO 904 communicates instructions to the smart meter 903 triggering a fund transfer (920) to the smart meter 901 from the smart meter 903, based on determining a match between smart meters 901 and 903. Further, the DSO 904 communicates instructions to the smart meter 901 triggering an energy transfer (922) to the smart meter 903 from the smart meter 901, based on determining a match between smart meters 901 and 903. In one or more cases, the wallet 910 associated with the smart meter 903 may provide and transfer (924) the funds associated with the energy transfer to the wallet 912 associated with the smart meter 901. In one or more cases, the DSO 904 and associated smart contract may track the funds transfer and update the balances of the associated wallets. In one or more cases, the smart meter 901 may receive from the DSO 904 an identifier associated with the smart meter that is receiving the energy (e.g., smart meter 903) and the amount of energy to provide to the smart meter. In some cases, the smart meter 901 may provide the requested amount of energy and identifier of the smart meter 903 to a distribution system, such as distribution system 212. In one or more cases, the distribution system may transfer (906) the requested amount of energy from the smart meter 901 to the smart meter 903 associated with the identifier. In some cases, the smart meter 903 may provide a confirmation of the energy transfer to the DSO 904 (908).

Although the subject matter has been described in terms of preferred embodiments, the subject matter should be construed broadly, to include other variants and embodiments, which may be made by those skilled in the art.

What is claimed is:

1. A system, comprising:
  a non-transitory memory having instructions stored thereon and a processor configured to execute the instructions to:
    receive data corresponding to a plurality of operational parameters corresponding to at least one facility within a first microgrid;
    determine a predicted potential for one or more energy outages of the at the least one facility within the first microgrid, wherein the predicted potential for the one or more energy outages is determined by a trained machine learning model, wherein the trained machine learning model is generated based on a training data set including historical energy load data, energy generation and storage capacity, weather data, outage information and operational parameters;
    determine an initial required energy level for the at least one facility based on the received data and on the predicted potential for one or more outages and an available energy generation and storage levels within the first microgrid;
    determine a requested amount of energy supply based on the initial required energy level;
    communicate the requested amount of energy supply supply to one or more second microgrids;
    match and associate a first smart meter of the first microgrid with a second smart meter of the second microgrid; and
    receive a transfer of the requested amount of energy supply based on the association between the first smart meter of the first microgrid with the second smart meter of the second microgrid.

2. The system of claim 1, wherein the received transfer of the requested amount of energy supply includes tracking energy distribution using a distributed ledger.

3. The system of claim 2, wherein the distributed ledger includes a blockchain.

4. The system of claim 3, wherein the blockchain includes a layer configured to provide peer-to-peer energy transfer.

5. The system of claim 1, wherein the received transfer of the requested amount of energy supply comprises identifying an electricity quotient and a destination using a smart contract.

6. The system of claim 1, wherein the processor is further configured to send a confirmation of the received transfer of energy that triggers a funds transfer.

7. The system of claim 1, wherein the processor is further configured to send a funds transfer to the second microgrid corresponding to the received energy transfer.

8. The system of claim 7, wherein the first microgrid has a payment wallet for completing the funds transfer with a payment wallet of the associated second microgrid.

9. The system of claim 1, wherein the match and association of the first smart meter of the first microgrid with the second smart meter of the second microgrid is based on an assigned priority for the first microgrid.

10. The system of claim 1, wherein the match and association of the first smart meter with the second smart meter is based on a priority setting assigned to the at least one facility.

11. A method of transferring energy comprising:
receiving data corresponding to a plurality of operational parameters for at least a first microgrid, the operational parameters comprising one or more of energy load data, energy generation capacity, energy storage capacity, weather and environmental data, predicted weather and environmental date, and historical critical energy load requirement information, including energy distribution outages;
determining a predicted potential for one or more critical energy load requirements for the first microgrid, wherein the predicted potential for the one or more critical energy load requirements is determined by a trained machine learning model, wherein the trained machine learning model is generated based on a training data set including historical operational parameters;
determining an initial required energy for the first microgrid based on the received data and on the predicted potential for one or more critical energy load requirements and an available energy supply and storage levels within the first microgrid;
determining a requested amount of energy based on the initial required energy for the first microgrid;
communicating the requested amount of energy to one or more second plurality of smart meters within one or more one second microgrids;
receiving a supply offer from one or more smart meters based on the communicated request;
matching based on account parameters at least one smart meter of the second plurality of smart meters with at least a first smart meter within the first microgrid;
receiving a transfer of an amount of energy by the first microgrid; and
transferring funds based on the account parameters from the first microgrid to the second microgrid.

12. The method of claim 11, wherein the receiving of the transfer of the amount of energy includes tracking energy distribution using a distributed ledger.

13. The method of claim 12, wherein the distributed ledger includes a blockchain.

14. The method of claim 13, wherein the blockchain includes a layer configured to provide peer-to-peer energy transfer.

15. The method of claim 11, wherein the received transfer of the amount of energy comprises identifying an electricity quotient and a destination using a smart contract.

16. The method of claim 11, wherein the matching of the one smart meter of the second plurality of smart meters with the first smart meter within the first microgrid is based on an assigned need priority for a critical energy load requirement by the first microgrid.

17. The method of claim 11, wherein the match of the one smart meter of the second plurality of smart meters with the first smart meter within the first microgrid is based on a first smart meter available within the one or more smart meters within the second microgrid.

18. The method of claim 11, wherein the first smart meter has an associated payment wallet for completing the funds transfer with a payment wallet associated with the one smart meter within the second plurality of smart meters.

* * * * *